D. R. Clem.
Grinding Mill.
Nº 61,714.   Patented Feb. 5, 1867.
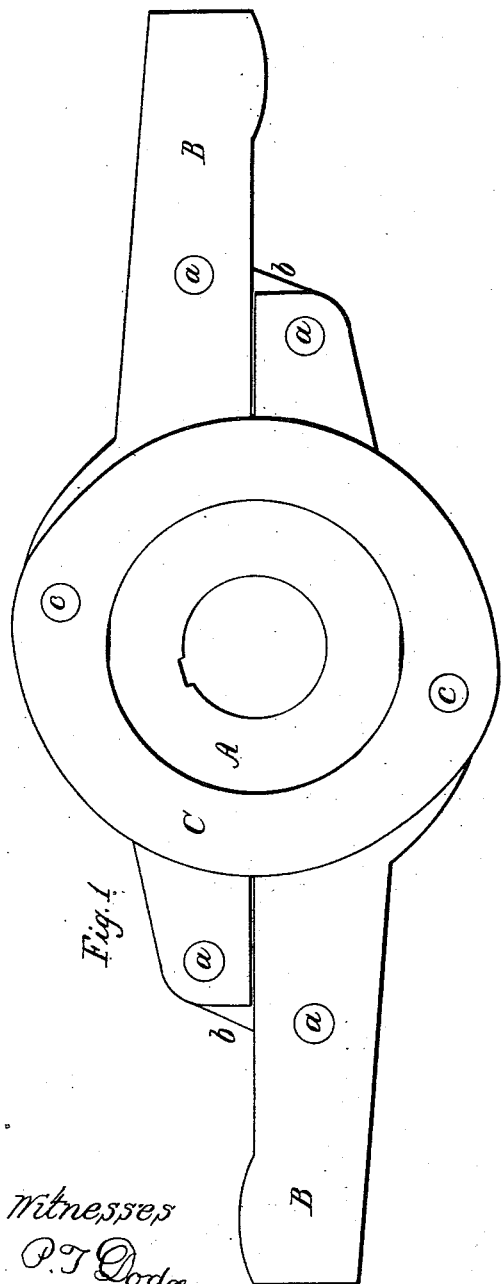
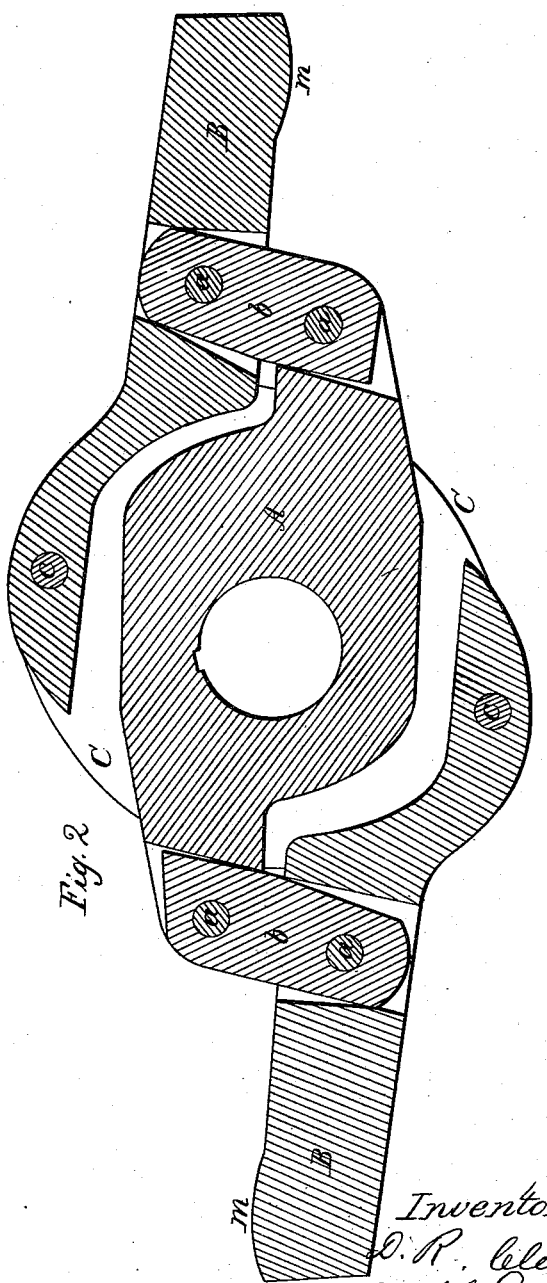
Witnesses
P. T. Dodge
Michael Larner
Inventor
D. R. Clem
By N. C. Dodge
Attorney

United States Patent Office.

D. R. CLEM, OF FRONT ROYAL, VIRGINIA.

Letters Patent No. 61,714, dated February 5, 1867.

IMPROVEMENT IN GRINDING-MILLS.

*The Schedule referred to in these Letters Patent and making part of the same.*

TO ALL WHOM IT MAY CONCERN:

Be it known that I, D. R. CLEM, of Front Royal, in the county of Warren, and State of Virginia, have invented certain new and useful Improvements in Millstone Drivers; and I do hereby declare that the following is a full, clear, and exact description thereof, reference being had to the accompanying drawings, making part of this specification, and to the letters of reference marked thereon, like letters indicating like parts wherever they occur.

To enable others skilled in the art to construct and use the invention, I will proceed to describe it.

My invention consists in constructing the driver of separate pieces, so pivoted and jointed that it will adjust itself, and thus drive the stone evenly and truly.

Figure 1 is a plan view; and

Figure 2, a horizontal section.

It is customary to construct the driver of millstones of a single rigid piece of metal, having a hole in the centre for fastening it to the spindle, and having its ends resting in notches cut in the stone. When such a device is used, it is formed so that very frequently the ends resting in the notches wear unequally, and that when this occurs the stone is tilted or tipped, so that it does not run evenly and truly, one side being more or less raised, thus permitting the grain on that side to escape without being sufficiently ground, while on the opposite side it is depressed, thereby grinding the flour too fine or close, and injuring its quality. To remedy these difficulties I construct my improved driver of a central piece, A, which fits upon the spindle, and two arms or levers, B, as shown in the drawings. The central piece A is made in the form shown in fig. 2, and is connected at each end by a link, $b$, to the arm B, about midway of its length. The arms B have their inner ends curved, so as to pass along by the side of A; and these inner ends are connected by a ring, C, to which they are pivoted by pins $c$, as shown, there being duplicate rings, one on the upper and one on the lower side. By this method of uniting the arms B and the central piece A, it will be seen that the arms B will form levers, fulcrumed at $a$, and that when their outer ends move in either direction, as they are at liberty to do to a given extent, their inner ends will move together in the opposite direction. The face of the outer end of the arms B, where they press against the stone to give it rotation, are rounded, and project slightly, as shown at $m$, the object of which is to permit the driver to adjust itself perfectly without binding in any way. By this method of constructing the driver it adjusts itself perfectly, so that any unequal wear of the arms or the stone, where the two come in contact, will not tend to throw the stone out of line, or make it revolve irregularly; and thus I insure an even and steady rotation of the stone, by which means a uniform quality or grade of work is at all times produced, and the time required for refitting the parts is saved. Another beneficial result of the use of my improved driver is, that if the spindle by any means gets moved at the toe, the driver adjusts itself in such a manner that the stone still runs true, keeping the grinding faces of the stones parallel and true, thereby saving wear and power, and insuring far more perfect operation.

Having thus described my invention, what I claim, is—

The driver composed of the central piece A and the arms B, united and arranged to operate substantially as and for the purpose set forth.

D. R. CLEM.

Witnesses:
P. T. DODGE,
H. B. MUNN.